US010148772B2

(12) United States Patent
Azose (10) Patent No.: US 10,148,772 B2
(45) Date of Patent: Dec. 4, 2018

(54) SYSTEM AND METHOD FOR AUTOMATICALLY PUSHING LOCATION-SPECIFIC CONTENT TO USERS

(71) Applicant: Google Inc., Mountain View, CA (US)

(72) Inventor: Benjamin Albert Azose, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 78 days.

(21) Appl. No.: 14/461,604

(22) Filed: Aug. 18, 2014

(65) Prior Publication Data

US 2016/0050283 A1   Feb. 18, 2016

(51) Int. Cl.
*H04L 29/08* (2006.01)
*G06F 17/30* (2006.01)

(52) U.S. Cl.
CPC .......... *H04L 67/18* (2013.01); *G06F 17/3087* (2013.01); *H04L 67/26* (2013.01); *H04L 67/2857* (2013.01)

(58) Field of Classification Search
CPC ........... G06F 17/3087; G06F 17/30241; G06F 17/30864; G06F 17/30395; G06F 17/30451; G06F 17/30867; G06F 3/0481; G06F 17/2235; G06F 17/2247; G06F 17/241; G06F 17/30141; G06F 17/30206; G06F 17/30398; H04L 67/18; H04L 41/0618; H04L 51/20; H04L 5/0069; H04L 12/1831; H04L 12/4641; H04L 12/5689; H04L 29/12066; H04L 29/1216; H04L 29/12981; H04L 43/045; H04L 61/1511; H04L 61/157; H04L 61/609; H04L 67/2857; G06Q 30/0256; G06Q 10/02; G06Q 10/06; G06Q 10/08; G06Q 30/02; G06Q 50/10; G06Q 10/101; G06Q 10/103; G06Q 30/00; G06Q 30/0239; G06Q 30/0267; G06Q 30/0277; G06Q 30/0641; G06Q 50/01
USPC ....... 709/203, 217, 218, 219, 224, 204, 216, 709/225, 229, 232, 238, 239, 245; 707/E17.108, 999.003, 999.005, E17.014,
(Continued)

(56) References Cited

U.S. PATENT DOCUMENTS 6,671,424 B1    12/2003  Skoll et al.
8,060,525 B2 *  11/2011  Svendsen .......... G06F 17/30041
                                                        707/769

(Continued)

OTHER PUBLICATIONS

Travel MOCO—A Mobile Community Service to Tourists ACM DL Digital Library Publication, dated Oct. 19, 2015. (16 pages) http://dl.acm.org/citation.cfm?id=1439774.

(Continued)

*Primary Examiner* — Patrice L Winder
*Assistant Examiner* — Abderrahmen Chouat
(74) *Attorney, Agent, or Firm* — Dority & Manning, P.A.

(57) ABSTRACT

In one aspect, a computer-implemented method for automatically pushing location-specific content to users may generally include identifying, by one or more computing devices, a geographic location at which a plurality of users have viewed location-specific content on their client devices, identifying at least one common content item associated with the location-specific content viewed by two or more of the users, receiving an indication that a first user is traveling to the geographic location and transmitting the common content item(s) for storage on a client device associated with the first user.

17 Claims, 3 Drawing Sheets

(58) Field of Classification Search
USPC .......... 707/724, 999.102, E17.018, 999.004,
707/999.01, 999.104, E17.001, E17.002,
707/E17.009, E17.032, E17.044, E17.084,
707/E17.115, 708, 709, 722, 723, 725,
707/728, 771, 999.002, 999.1, 999.107
See application file for complete search history.

(56) References Cited

U.S. PATENT DOCUMENTS

| | | |
|---|---|---|
| 8,260,320 B2 | 9/2012 | Herz |
| 2008/0070588 A1* | 3/2008 | Morin .................... H04W 4/02 455/456.1 |
| 2010/0046842 A1* | 2/2010 | Conwell ........... G06F 17/30265 382/218 |
| 2011/0202514 A1* | 8/2011 | Singh ................ G06F 17/30241 707/706 |
| 2011/0252050 A1* | 10/2011 | Palleti ............... G06F 17/30876 707/769 |
| 2012/0110031 A1* | 5/2012 | Lahcanski ......... G06F 17/30241 707/812 |
| 2013/0227052 A1 | 8/2013 | Wenzel et al. |
| 2013/0232200 A1* | 9/2013 | Knapp .................. H04L 67/306 709/204 |
| 2013/0304910 A1* | 11/2013 | Hanlon .................. G06Q 10/06 709/224 |
| 2013/0332068 A1 | 12/2013 | Kesar et al. |
| 2014/0207952 A1* | 7/2014 | Wassingbo ........ G06F 17/30867 709/224 |
| 2014/0244742 A1* | 8/2014 | Yu ........................ H04L 65/403 709/204 |

OTHER PUBLICATIONS

PCT International Search Report PCT/US2015/041698, dated Jul. 23, 2015. (11 pages).
Travel Moco—A Mobile Community Service for Tourists 7th International Conference on Mobile Business Christer Carlsson, Pirkko Walden and Fuyi Yang—Inventors IAMSR/Abo Akademi University, 2008. (10 pages).

* cited by examiner

SYSTEM AND METHOD FOR AUTOMATICALLY PUSHING LOCATION-SPECIFIC CONTENT TO USERS

FIELD

The present subject matter relates generally to providing content to users and, more particularly, to a system and method for automatically pushing location-specific content to users.

BACKGROUND

The use of mobile computing devices, such as smartphones, tablets and the like, has become increasingly widespread over the last decade. Specifically, many users today often rely on their mobile devices as the primary means for accessing online content and other related information. This is particularly true for users that are traveling away from home, whether such users are simply traveling to a local park or restaurant or somewhere significantly further from their home (e.g., when taking a trip to a new city or country). For example, upon arrival at a given location, users often rely on their mobile device to provide them with information related to their current location. However, in many instances, the availability of a wireless network (e.g., a cell phone network and/or a WiFi network) at the user's current location may be limited or even non-existent. In such instances, it may be difficult or even impossible for the user to access online content in an attempt to obtain useful information about his/her location.

SUMMARY

Aspects and advantages of embodiments of the invention will be set forth in part in the following description, or may be obvious from the description, or may be learned through practice of the embodiments.

In one aspect, the present subject matter is directed to a computer-implemented method for automatically pushing location-specific content to users. The method may generally include identifying, by one or more computing devices, a geographic location at which a plurality of users have viewed location-specific content on their client devices, identifying at least one common content item associated with the location-specific content viewed by two or more of the users, receiving an indication that a first user is traveling to the geographic location and transmitting the common content item(s) for storage on a client device associated with the first user.

In another aspect, the present subject matter is directed to a system for automatically pushing location-specific content to users. The system may generally include one or more computing devices including one or more processors and associated memory. The memory may store instructions that, when executed by the processor(s), configure the computing device(s) to identify a geographic location at which a plurality of users have viewed location-specific content on their client devices, identify at least one common content item associated with the location-specific content viewed by two or more of the users, receive an indication that a first user is traveling to the geographic location and transmit the common content item(s) for storage on a client device associated with the first user.

In a further aspect, the present subject matter is directed to a tangible, non-transitory computer-readable medium storing computer-executable instructions that, when executed by one or more processors, cause the processor(s) to perform specific operations. The operations may generally include identifying a geographic location at which a plurality of users have viewed location-specific content on their client devices, identifying at least one common content item associated with the location-specific content viewed by two or more of the users, receiving an indication that a first user is traveling to the geographic location and transmitting the common content item(s) for storage on a client device associated with the first user.

Other exemplary aspects of the present disclosure are directed to other methods, systems, apparatus, non-transitory computer-readable media, user interfaces and devices for automatically pushing location-specific content to users.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For instance, features illustrated or described as part of one embodiment can be used with another embodiment to yield a still further embodiment. Thus, it is intended that the present subject matter cover such modifications and variations as come within the scope of the appended claims and their equivalents.

In general, the present subject matter is directed to a system and method for automatically pushing location-specific content to users. Specifically, in several embodiments, geographic locations may be identified at which users, when positioned at such locations, view content associated with the locations. For example, users located within or near a park may access content related to a trail map for the park (e.g., an image of the map stored on their device or a website containing the map) while users located at a restaurant or tourist attraction may access content related to the restaurant/attraction (e.g., an online menu or a website explaining the history of the attraction).

In several embodiments, for each geographic location, the specific content viewed by users at such location may be identified and analyzed to determine common content items viewed by two or more of the users, such as common images or common webpages viewed by multiple users at the geographic location. The common content items may then be associated with the geographic location and automatically transmitted to future users traveling to such location. For instance, if an indication is received that a user is traveling to a specific geographic location (e.g., the user requests travel directions to the location or is near the location), the common content item(s) associated with the location may be transmitted to the user's device and temporarily stored or cached for subsequent use. Thereafter, when the user actually reaches the location, the common content item(s) may be displayed or otherwise made available to the user. Such automatic transmission and caching of the content data may allow for the content to be available to the user even if the location is in an area with poor cell phone reception and/or limited access to other wireless networks.

It should be appreciated that the technology described herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer processes discussed herein may be implemented using a single computing device or multiple computing devices working in combination. Databases and applications may be implemented on a single system or distributed across multiple systems. Distributed components may operate sequentially or in parallel.

It should also be appreciated that, in situations in which the systems and methods described herein access and analyze personal information about users, make use of personal information and/or access and analyze position data and/or content data associated with users, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user. Accordingly, in several embodiments of the present subject matter, in order to obtain the benefits of the techniques described herein, a user may be required to install an application and/or select a setting to provide consent for the collection and/or analysis of position data and/or content data associated with the user. If the user does not provide such consent, the benefits of the techniques described herein may not be received.

Figure 1:
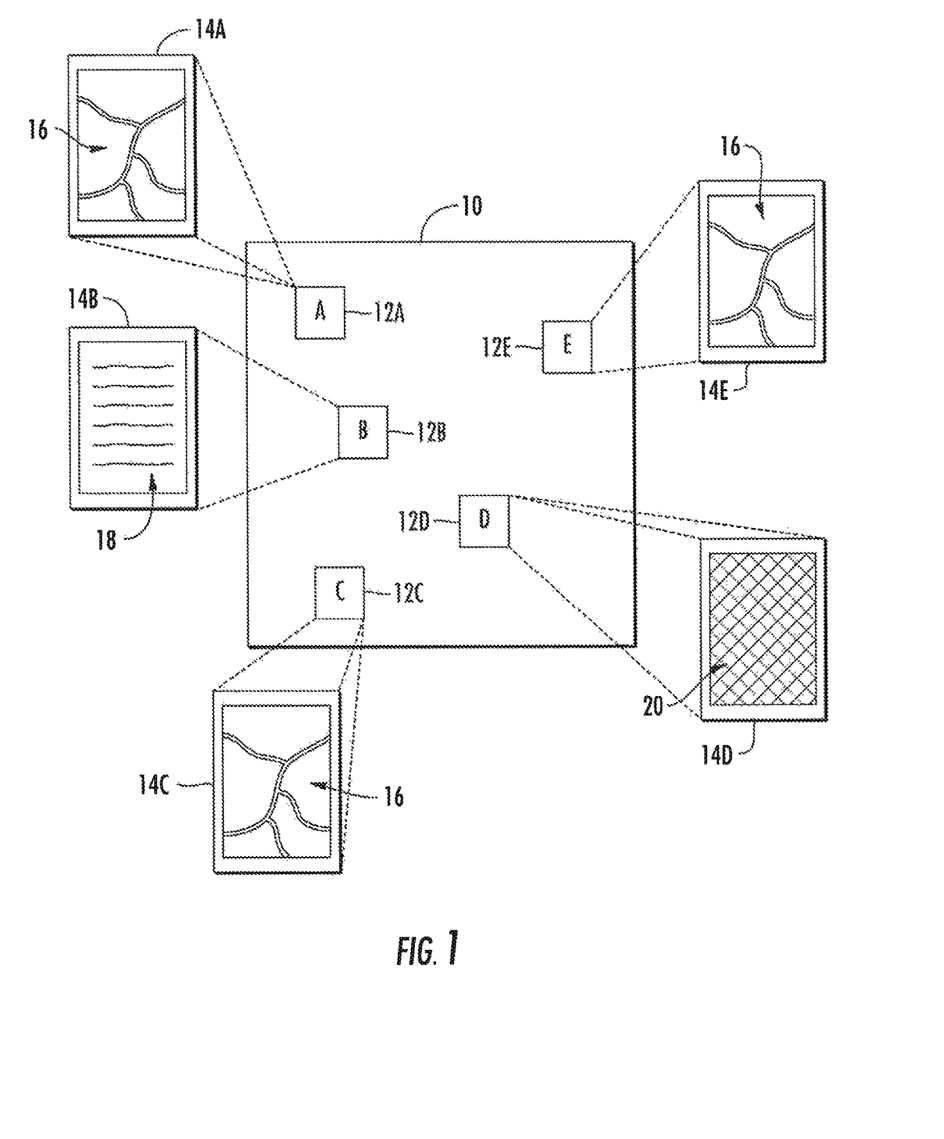
FIG. 1 illustrates an example view of a suitable application in which aspects of the present subject matter may be advantageously applied in order to implement embodiments of the disclosed system and method.

Referring now to FIG. 1, one example of a suitable, real-world application in which aspects of the present subject matter may be advantageously applied in order to implement embodiments of the disclosed system and method is illustrated. As shown, when at a given geographic location 10, users 12A-12E may utilize their mobile devices 14A-14E to access and view content, such as content stored locally on their devices and/or network-based content. In many instances, the content viewed by a user may be associated with the geographic location 10 at which he/she is currently positioned. For example, in the illustrated embodiment, five users 12A-12E are shown as being located within a park (indicated by the bounded area 10). At some point while in the park, three of the five users 12A, 12C, 12D viewed an image 16 of the park's trail map on their client device 14A, 14C, 14D. Another user 12B viewed a webpage 18 including information about the park's operating hours while yet another user 12D viewed online content 20 not related to the park (e.g., by checking his/her email).

Given that multiple users viewed the park's trail map while navigating within the park, it suggests that other users may also be interested in accessing an image(s) of the trail map when visiting the park. Thus, in accordance with aspects of the present subject matter, the disclosed system and method may provide a means for automatically pushing an image of the trail map to a user that has indicated (e.g., via a navigation request or otherwise) that he/she will be traveling to the park in the future. In such instance, the image may be transmitted to the user's device and temporarily stored thereon for subsequent use. Later, when the user arrives at the park, the image may be immediately available to the user for display on his/her device.

As will be described below, by analyzing the content viewed by users when located at a given geographic location, common content items may be identified that have been viewed by multiple users, thereby providing an indication that the content contained within the items may be relevant to users traveling to the geographic location. Such common content items may then be automatically pushed to other users traveling to the location. For example, if further data collection indicates that multiple users have also viewed the webpage 18 containing the park's operating hours, it may be desirable to automatically push the image 16 of the trail map as well as data related to the park's operating hours to users that have indicated that they will be travelling to the park.

It should be appreciated that, as used herein, the term "geographic location" may refer to a single point location (e.g., a location associated with a given set of geographic coordinates) or a broader range of locations that form part of a common geographic area or that are otherwise related. For example, the range of geographic coordinates encompassing a given park, beach or other tourist attraction may be considered a "geographic location" in reference to such park, beach or other tourist attraction. Thus, as shown in FIG. 1, the entire geographic area (indicated by box 10) encompassing the park may be referred to as the park's geographic location for purposes of the present disclosure.

Figure 2:
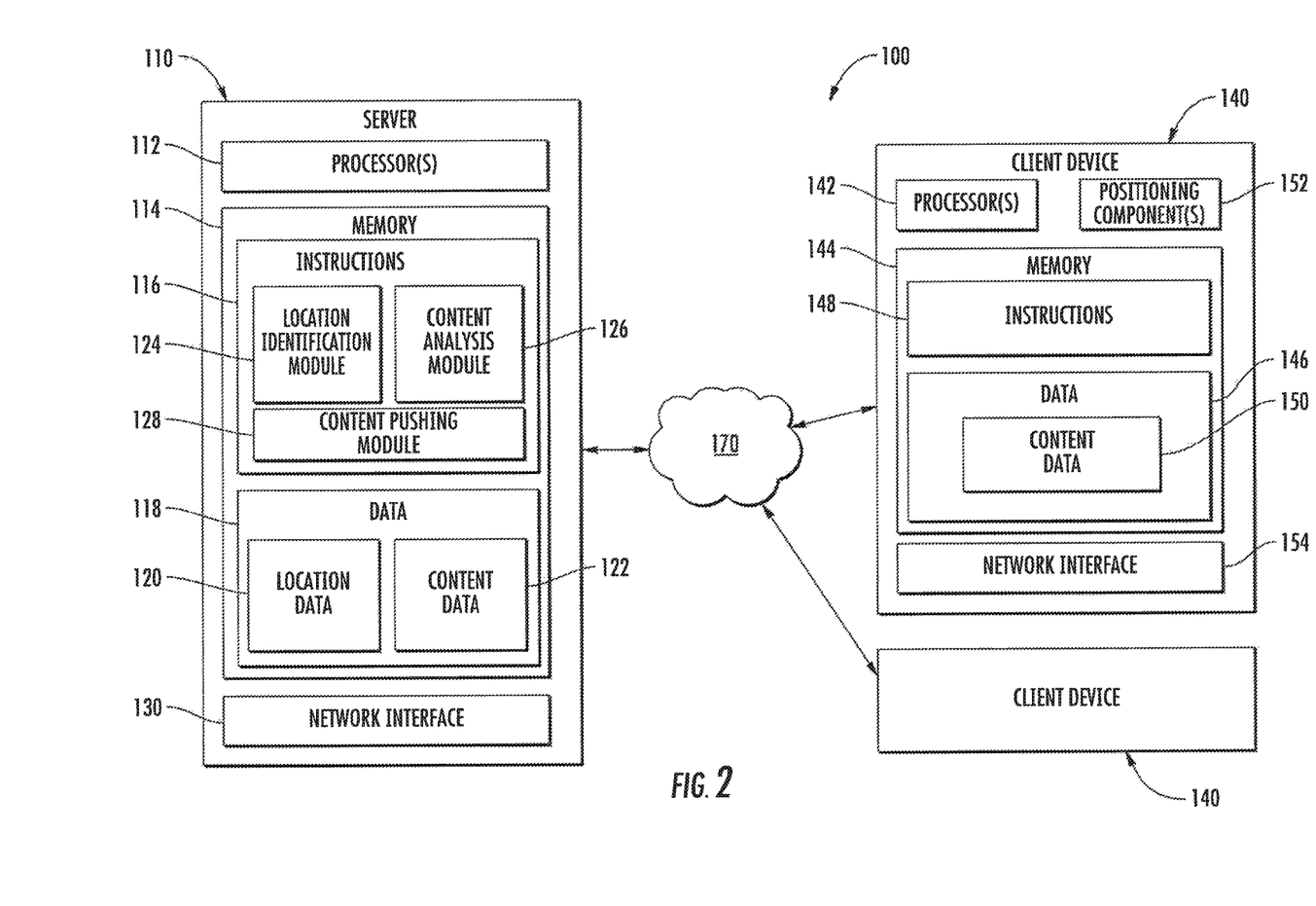
FIG. 2 illustrates a schematic diagram of one embodiment of a system for automatically pushing location-specific content to users in accordance with aspects of the present subject matter.

Referring now to FIG. 2, one embodiment of a system 100 for automatically pushing location-specific content to users is illustrated in accordance with aspects of the present subject matter. As shown in FIG. 2, the system 100 may include a client-server architecture where a server 110 communicates with one or more clients, such as a local client device 140, over a network 170. The server 110 may generally be any suitable computing device, such as a remote web server(s) or a local server(s), and/or any suitable combination of computing devices. For instance, the server 110 may be implemented as a parallel or distributed system in which two or more computing devices act together as a single server. Similarly, the client device 140 may generally be any suitable computing device(s), such as a laptop(s), desktop(s), smartphone(s), tablet(s), wearable computing device(s), a display with one or more processors coupled thereto and/or embedded therein and/or any other computing device(s). In a particular embodiment, the client device 140 may correspond to a mobile device(s) that may be transported with a user as he/she is traveling to one or more geographic locations, such as a smartphone, a tablet and/or any other suitable mobile device (e.g., mobile devices 14A-14E shown in FIG. 1). Although only two client devices 140 are shown in FIG. 2, it should be appreciated that any number of clients may be connected to the server 110 over the network 170.

As shown in FIG. 2, the server 110 may include a processor(s) 112 and a memory 114. The processor(s) 112 may be any suitable processing device, such as a microprocessor, microcontroller, integrated circuit, or other suitable processing device. Similarly, the memory 114 may include any suitable computer-readable medium or media, including, but not limited to, non-transitory computer-readable media, RAM, ROM, hard drives, flash drives, or other memory devices. The memory 114 may store information accessible by processor(s) 112, including instructions 116 that can be executed by processor(s) 112 and data 118 that can be retrieved, manipulated, created, or stored by processor(s) 112. In several embodiments, the data 118 may be stored in one or more databases.

For instance, as shown in FIG. 2, the memory 114 may include a location database 120 storing location or position data associated with one or more client devices 140. For example, as will be described below, each client device 140 may include a positioning component(s) 152 configured to generate position data associated with the current geographic location of the device 140. In several embodiments, such position data may be transmitted to the server 110 and stored within the location database 120. In addition to the position data associated with one or more client devices 140, or as an alternative thereto, the location database may also store data associated with identified geographic locations at which multiple users have viewed content on their client devices 140. For instance, as will be described below, the disclosed system 100 may be utilized to identify one or more geographic locations at which users, when positioned at such locations, view location-specific content related to the location(s). In such embodiments, the identified geographic location(s) may, for example, be stored within the location database 120 for subsequent reference when implementing the methodologies disclosed herein. Alternatively, the identified geographic location(s) may be stored in any other suitable database that may be accessed by the server 110.

In several embodiments, the memory 114 may also include a content database 122 storing data associated with content (e.g., one or more specific content items) viewed by one or more users on their client devices 140. In general, the term "content" may refer to any information being viewed, consumed or otherwise made available to a user of a client device 140 and may include, but is not limited to, visual data, audio data and/or combinations thereof. An item, such as a webpage, article, image, video clip, audio clip, 2-D map, 3-D globe and/or other items, may be represented as a collection of content. Thus, the term "content item" generally refers to a specific piece or set of information associated with or included within an item. For example, a specific portion of text or a specific image contained within a webpage including other text and/or images may, itself, be considered a specific content item. Alternatively, the entire webpage (including all of its related content) may be considered a content item. Content items may be stored locally on a client device 140 (e.g., client-based content, such as an image stored locally on a device 140) or may be made available to the client device 140 via a network 170 (e.g., network-based content). For example, network-based content may be made available to the client device 140 via the server 100 or through any other suitable online content provider.

In several embodiments, the content database 122 may be configured to store data associated with location-specific content viewed by users at particular geographic locations. In general, location-specific content may correspond to information made available to a user of a client device 140 that is associated with a specific geographic location(s), such as content that provides information pertaining to the area(s) surrounding the geographic location(s), the building(s) and/or other structures present at or around the geographic location(s) and/or any other useful information associated with the specific geographic location(s). For example, location-specific content associated with a park may include images of particular locations within the park, trail maps, textual information related to the history of the park and/or the like. Similarly, location-specific content associated with a location at or adjacent to a restaurant may include, for instance, information related to the restaurant's menu, the operating hours of the restaurant and/or current wait times associated with the restaurant.

In addition to storing location-specific content, or as an alternative thereto, the content database 122 may also be configured to store common content items associated with the location-specific content being viewed by users. For example, as will be described below, the location-specific content viewed by users at a given geographic location(s) may be analyzed to identify common content items viewed by two or more of the users, such as specific images, textual data and/or any other suitable content items viewed by multiple users when such users are positioned at the geographic location(s). In such embodiments, the common content items may be stored within the content database 122 and linked to or otherwise associated with their corresponding geographic location(s).

Referring still to FIG. 2, the instructions 116 stored within the memory 114 may, in several embodiments, be executed by the processor(s) 112 to implement a location identification module 124. In several embodiments, the location identification module 124 may be configured to identify instances in which users, when positioned at a given geographic location, utilize their client devices 140 to view location-specific content associated with such geographic location. For instance, as indicated above, the server 110 may be configured to receive position data from each client device 140 that is associated with the current geographic location of the device 140. Thus, by analyzing the content viewed on a given client device 140 in reference to its current geographic location, it may be determined when the device 140 is being used to view location-specific content associated with such geographic location. The geographic location along with the corresponding location-specific content may then be stored within a database accessible to the server (e.g., the location and/or the content databases 120, 122). By collecting such data over an extended period of time, specific geographic locations may be matched to or otherwise associated with the location-specific content viewed by users when positioned at such locations.

Additionally, the instructions 116 stored within the memory 114 may also be executed by the processor(s) 112 to implement a content analysis module 126. In general, the content analysis module 126 may be configured to analyze the location-specific content viewed by users at a given geographic location in order to identify one or more common content items. Common content items may generally correspond to content items viewed by two or more users at a corresponding geographic location that incorporate or include the same location-specific content. For instance, referring back to the example shown in FIG. 1, if two or more users located within a park access or otherwise view an image of the park's trail map (e.g., by accessing an image of the trail map on the internet or by viewing an image of the trail map taken using their device's camera), the image may be considered a common content item associated with the park's geographic location. Similarly, if two or more users located at or near a restaurant view the restaurant's webpage and/or an image of the restaurant's menu, the webpage and/or image may be considered a common content item associated with the restaurant's geographic location.

In several embodiments, a content item including or incorporating location-specific content associated with a particular geographic location may only be considered a common content item if the content item is viewed by more than a predetermined percentage of the users viewing location-specific content at the geographic location. For example, in a particular embodiment, a given content item may be considered a common content item when at least 20% of the users viewing location-specific content at an associated geographic location view such content by accessing or otherwise viewing the content item, such as when at least 40% of the users view the content item when positioned at the geographic location or when at least 50% of the users view the content item when positioned at the geographic location.

It should be appreciated that the location-specific content viewed by users at a given geographic location may be analyzed using any suitable means and/or methodology that allows for the identification of common content items. For example, in several embodiments, all of the location-specific content viewed by users at a particular geographic location may be compared using a suitable content comparison algorithm in order to identify common text, images, videos and/or other items within the location-specific content. Suitable content comparison algorithms may include, for example, text comparison algorithms, image comparison algorithms and/or the like. For example, text included within webpages viewed by users may be identified and compared using known text comparison techniques to identify similar or common textual phrases or sentences. Similarly, images viewed by users may be analyzed using a color recognition algorithm(s), optical character recognition algorithm(s), image parsing algorithm(s) and/or any other suitable image comparison algorithm(s) that allows for similarities in the images to be identified, such as similar text within the images or similar buildings/structures or other landscapes within the images. For instance, referring again to the example shown in FIG. 1, users within a park may take a picture of the park's trail map at the head of the trail and then access or otherwise view the picture at different locations along the trail (e.g., at forks in the trail). By analyzing the images viewed using a suitable image comparison algorithm(s), it may be determined that each image corresponds to a picture of the trail map. As a result, an image of the trail map may be identified as a common content item to be associated with the park's geographic location.

The instructions 116 stored within the memory 114 may also be executed by the processor(s) 112 to implement a content pushing module 128. Specifically, in several embodiments, the content pushing module 129 may be configured to automatically push a common content item(s) associated with a given geographic location to a user's device when an indication is received that the user may be traveling to the geographic location. For example, the content pushing module 128 may receive an indication that a user is traveling to a specific geographic location when the user inputs a search request or a navigation request associated with the geographic location. Alternatively, the content pushing module 128 may receive such an indication by receiving position data indicating that the user is positioned near or traveling towards the geographic location or by receiving an express indication from the user that he/she is traveling to the geographic location. Regardless, upon receiving the indication, the content pushing module 128 may be configured to transmit one or more common content items associated with the geographic location (e.g., as determined by the location identification and content analysis modules 124, 126) for temporary storage on the user's device. For example, the common content item(s) may be transmitted to the user's device prior to the user actually arriving at the geographic location. As a result, when the user reaches the geographic location, the common content item(s) may be immediately accessed by the user.

It should be appreciated that, as used herein, the term "module" refers to computer logic utilized to provide desired functionality. Thus, a module may be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

As shown in FIG. 2, the server 110 may also include a network interface 130 for providing communications over the network 170. In general, the network interface 130 may be any device/medium that allows the server 110 to interface with the network 170.

Similar to the server 110, the client device 140 may also include one or more processors 142 and associated memory 144. The processor(s) 142 may be any suitable processing device known in the art, such as a microprocessor, microcontroller, integrated circuit, or other suitable processing device. Similarly, the memory 144 may be any suitable computer-readable medium or media, including, but not limited to, non-transitory computer-readable media, RAM, ROM, hard drives, flash drives, or other memory devices. As is generally understood, the memory 144 may be configured to store various types of information, such as data 146 that may be accessed by the processor(s) 142 and instructions 148 that may be executed by the processor(s) 142. The data 146 may generally correspond to any suitable files or other data that may be retrieved, manipulated, created, or stored by processor(s) 142. In several embodiments, the data 146 may be stored in one or more databases. Similarly, the instructions 148 stored within the memory 144 may generally be any set of instructions that, when executed by the processor(s) 142, cause the processor(s) 142 to provide desired functionality. For example, the instructions 148 may be software instructions rendered in a computer readable form or the instructions may be implemented using hard-wired logic or other circuitry.

As shown in FIG. 2, the memory 144 may include a content database 150 storing data associated with any suitable type of content. For example, specific content items created using the client device 140 (e.g., images or videos captured using the device and/or textual data generated with the device) and/or specific content items downloaded over the network 170 may be stored locally within the content database 150. Such network-based content may generally be included within any suitable content items made available to the user from any suitable online content provider, including common content items transmitted to the client device 140 via the server 110. As indicated above, common content items transmitted from the server 110 may be temporarily stored or cached on the client device 140. Alternatively, the common content items may be stored permanently within the device's memory 144.

In addition, the client device 140 may also include a positioning component(s) 152 for generating position data associated with the current geographic location of the device 140. For instance, the positioning component(s) 152 may be a GPS module or sensor configured to determine position data for the client device 140 based on signals received from one or more satellites. In another embodiment, the positioning component(s) 152 may be a location module or sensor configured to determine position data for the client device 140 based on signals received from one or more cell phone towers. Alternatively, the positioning component(s) 152 may be any other suitable module, sensor and/or component that is capable of determining position data for the client device 140. The position data may include, for example, time-stamped geographic coordinates for the client device 140, which may, in turn, allow the travel velocity of the client device 140 to be determined. As indicated above, the client device 140 may be configured to communicate the position data to the server 110 over the network 170.

Moreover, as shown in FIG. 2, the client device 140 may also include a network interface 154 for providing communications over the network 170. Similar to the interface 130 for the server 110, the network interface 154 may generally be any device/medium that allows the client device 140 to interface with the network 170.

It should be appreciated that the network 170 may be any type of communications network, such as a local area network (e.g. intranet), wide area network (e.g. Internet), or some combination thereof. The network can also include a direct connection between the client device 140 and the server 110. In general, communication between the server 110 and the client device 140 may be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Figure 3:
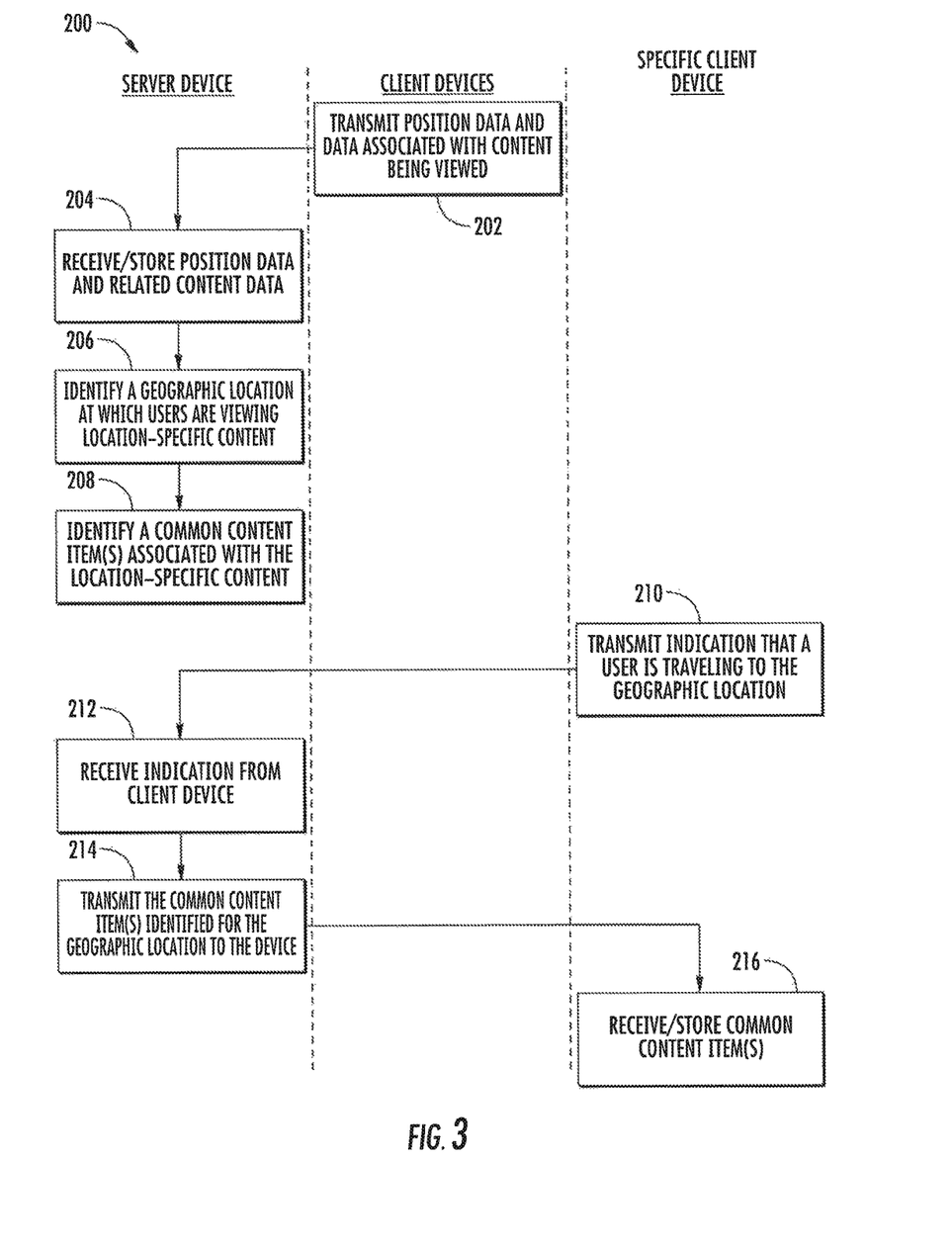
FIG. 3 illustrates a flow diagram of one embodiment of a method for automatically pushing location-specific content to users in accordance with aspects of the present subject matter.

Referring now to FIG. 3, a client-server flow diagram of one embodiment of a method 200 for automatically pushing location-specific content to users is illustrated in accordance with aspects of the present subject matter. The method 200 will generally be discussed herein with reference to the system 100 shown in FIG. 2. However, those of ordinary skill in the art, using the disclosures provided herein, should appreciate that the methods described herein may be executed by any computing device or any combination of computing devices. Additionally, it should be appreciated that, although the method blocks 202-216 are shown in FIG. 2 in a specific order, the various blocks of the disclosed method 200 may generally be performed in any suitable order that is consistent with the disclosure provided herein.

As shown in FIG. 3, the server 110 may initially collect data associated with the content being viewed by users at specific geographic locations. Thus, at (202), the method 200 may include transmitting data to the server 110 from a plurality of client devices 140 that is associated with the geographic location of each client device 140 as well as the content being viewed on each device 140 at such geographic location. At (204), the data may be received by and/or stored on the server 110. For example, as indicated above, the server 110 may include a location database 120 for storing position data associated with the travel history and/or current geographic location of a given client device 140 as well as a content database 122 for storing data associated with the content being viewed by users on their devices 140.

Additionally, at (206), the method 200 may include identifying a geographic location at which users are viewing location-specific content associated such location. For example, as described above, a location identification module 124 implemented by the server 110 may be configured to analyze the data received from the various client devices 140 in order to identify geographic locations at which location-specific content is being viewed. The identified geographic locations may then be stored within a database accessible to the server 110 (e.g., the location database 120).

Referring still to FIG. 3, at (208), the method 200 may include identifying at least one common content item for each identified geographic location that includes or is otherwise associated with the location-specific content viewed by users at each corresponding location. Specifically, as indicated above, a content analysis module 126 implemented by the server 110 may be configured to compare the location-specific content viewed at each geographic location and identify the content items, viewed by multiple users, that include the same location-specific content. For instance, referring back to the example shown in FIG. 1, by comparing the content viewed by various users while located within the park, it may be determined that a plurality of the users viewed an image of the park's trail map. In such instance, the image of the trail map may be identified as a common content item to be associated with the park's geographic location.

By identifying common content item(s) viewed by users at given geographic locations, a large dataset of locations and their associated content item(s) may be created and stored within a suitable database. The server 110 may then access the database to allow a specific content item(s) to be automatically pushed or transmitted to a user when it is determined that the user is travelling to a geographic location for which one or more common content items have been identified. For example, as shown in FIG. 3, at (210), a specific client device 140 may transmit an indication that the user of such device 140 appears to be traveling or is likely to be traveling to a particular geographic location. For instance, the client device 140 may transmit a search request associated with the geographic location (e.g., a Google search for the location) or a navigation request for travel directions to the geographic location. In another embodiment, position data transmitted from the client device 140 (e.g., via its positioning component(s) 152) may provide an indication that the user is traveling to the geographic location, such as if the position data indicates that the user is located near the geographic location or if the data indicates that the user appears to be traveling along a route commonly taken to travel to the location. Alternatively, the user may provide an express indication that he/she is traveling to the geographic location. For instance, a specific application implemented on the user's device that is designed to receive automatically pushed data may allow the user to transmit a request for common content item(s) associated with a given geographic location.

At (212), the method 200 may include receiving, at the server 110, the indication that the user is traveling to a particular geographic location. Thereafter, at (214), the method 200 may include transmitting the common content item(s) associated with the geographic location to the user's device. For example, as described above, upon receipt of the indication, a content pushing module 128 implemented on the server 110 may identify the common content item(s) associated with the corresponding geographic location and subsequently transmit such content item(s) back to the user's device for storage thereon.

Additionally, at (216), the method 200 may include receiving and/or storing the common content item(s) on the client device 140. For example, the common content item(s) may be temporarily stored or cached on the user's device for subsequent use when the user eventually arrives at the geographic location. Specifically, upon reaching the geographic location, the user may access the common content item(s) stored locally on his/her device without the need to connect a wired or wireless network. Thereafter, once the user leaves the geographic location or upon receipt of a request by the user, the common content item(s) may be deleted from the user's device.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for automatically pushing location-specific content to users, the method comprising:
   identifying, by one or more computing devices, a geographic location at which a plurality of users have viewed location-specific content on their client devices, the location-specific content viewed by each user corresponding to a user-captured image stored locally on the user's client device, wherein identifying, by the one or more computing devices, the geographic location at which the plurality of users have viewed location-specific content on their client devices comprises identifying, by one or more computing devices, a first location within the geographic location at which the plurality of users have viewed location-specific content on their client devices;
   comparing, by the one or more computing devices, the user-captured images viewed by two or more of the plurality of users using an image comparison algorithm to identify common image content contained within the user-captured images viewed by the two or more of the plurality of users, wherein the common image content comprises imagery that depicts a second location within the geographic location that is different from the first location;
   identifying, by the one or more computing devices, the common image content as a common content item associated with the location-specific content viewed by the two or more of the plurality of users;
   receiving, by the one or more computing devices, an indication that a first user is traveling to the geographic location;
   in response to receiving the indication, automatically pushing, by the one or more computing devices, the common content item to a client device associated with the first user for storage by a memory of the client device without receiving a request for the common content item from the client device;
   determining, by the one or more computing devices, that the first user has traveled to the geographic location and subsequently left the geographic location; and
   in response to determining that the first user has left the geographic location, automatically deleting, by the one or more computing devices, the common content item from the memory of the client device.

2. The computer-implemented method of claim 1, wherein automatically pushing the common content item comprises automatically pushing the common content item for storage at the memory of the client device prior to the first user arriving at the geographic location.

3. The computer-implemented method of claim 1, wherein the location-specific content includes information that is associated with the geographic location.

4. The computer-implemented method of claim 1, wherein the common image content is identified as the common content item if it is determined that a predetermined percentage of the plurality of users viewed the common image content at the geographic location.

5. The computer-implemented method of claim 1, wherein receiving the indication that the first user is traveling to the geographic location comprises receiving at least one of a search request or a navigation request associated with the geographic location.

6. The computer-implemented method of claim 1, wherein receiving the indication that the first user is traveling to the geographic location comprises receiving position data associated with a current geographic location of the client device.

7. The computer-implemented method of claim 1, wherein automatically pushing the common content item comprises automatically pushing the common content to the client device for temporary storage thereon.

8. The computer-implemented method of claim 1, wherein:
   the common image content comprises imagery that depicts a physical map that is physically located at the geographic location;
   the common content item comprises map content associated with the geographic location; and
   automatically pushing, by the one or more computing devices, the common content item to the client device comprises automatically pushing, by the one or more computing devices, the map content associated with the geographic location.

9. The computer-implemented method of claim 1, wherein:
   the common image content comprises the user-captured image stored locally on the user's client device, the user-captured image having been previously captured at the second location within the geographic location that is different from the first location.

10. A system for automatically pushing location-specific content to users, the system comprising:
    one or more computing devices including one or more processors and associated memory, the memory storing instructions that, when executed by the one or more processors, configure the one or more computing devices to:
    identify a geographic location at which a plurality of users have viewed location-specific content on their client devices, the location-specific content viewed by each user corresponding to a user-captured image stored locally on the user's client device, wherein to identify the geographic location the computing devices identify a first location within the geographic location at which the plurality of users have viewed location-specific content on their client devices;

compare the user-captured images viewed by two or more of the plurality of users using an image comparison algorithm to identify common image content contained within the user-captured images viewed by the two or more of the plurality of users, wherein the common image content comprises imagery that depicts a second location within the geographic location that is different from the first location;

identify the common image content as a common content item associated with the location-specific content viewed by the two or more of the plurality of users;

receive an indication that a first user is traveling to the geographic location;

in response to receiving the indication, automatically push the common content item to a client device associated with the first user for storage by a memory of the client device without receiving a request for the common content item from the client device;

determining that the first user has traveled to the geographic location and subsequently left the geographic location; and in response to determining that the first user has left the geographic location, automatically deleting the common content item from the memory of the client device.

11. The system of claim 10, wherein the one or more computing devices are configured to automatically push the common content item for storage by the memory of the client device prior to the first user arriving at the geographic location.

12. The system of claim 10, wherein the location-specific content includes information that is associated with the geographic location.

13. The system of claim 10, wherein the indication that the first user is traveling to the geographic location corresponds to at least one of a search request or a navigation request associated with the geographic location or corresponds to position data associated with a current geographic location of the client device.

14. A tangible, non-transitory computer-readable medium storing computer-executable instructions that, when executed by one or more processors, cause the one or more processors to perform operations, comprising:

identifying a geographic location at which a plurality of users have viewed location-specific content on their client devices, the location-specific content viewed by each user corresponding to a user-captured image stored locally on the user's client device, wherein identifying the geographic location at which the plurality of users have viewed location-specific content on their client devices comprises identifying a first location within the geographic location at which the plurality of users have viewed location-specific content on their client devices;

comparing the user-captured images viewed by two or more of the plurality of users using an image comparison algorithm to identify common image content contained within the user-captured images viewed by the two or more of the plurality of users, wherein the common image content comprises imagery that depicts a second location within the geographic location that is different from the first location;

identifying the common image content as a common content item associated with the location-specific content viewed by the two or more of the plurality of users;

receiving an indication that a first user is traveling to the geographic location;

in response to receiving the indication, automatically pushing the common content item to a client device associated with the first user for storage by a memory of the client device without receiving a request for the common content item from the client device;

determining that the first user has traveled to the geographic location and subsequently left the geographic location; and in response to determining that the first user has left the geographic location, automatically deleting the common content item from the memory of the client device.

15. The computer readable medium of claim 14, wherein automatically pushing the common content item comprises automatically pushing the common content item for storage by the memory of the client device prior to the first user arriving at the geographic location.

16. The computer readable medium of claim 14, wherein the location-specific content includes information that is associated with the geographic location.

17. The computer readable medium of claim 14, wherein receiving the indication that the first user is traveling to the geographic location comprises receiving at least one of a search request associated with the geographic location, a navigation request associated with the geographic location or position data associated with a current geographic location of the client device.

* * * * *